(12) United States Patent
Seward et al.

(10) Patent No.: US 11,496,432 B2
(45) Date of Patent: Nov. 8, 2022

(54) SYNCHRONIZING MESSAGE STATUS ACROSS MULTIPLE USER DEVICES

(71) Applicant: T-Mobile USA, Inc., Bellevue, WA (US)

(72) Inventors: Shelby Seward, Bellevue, WA (US); Thomas Cast, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/905,675

(22) Filed: Jun. 18, 2020

(65) Prior Publication Data
US 2021/0400006 A1 Dec. 23, 2021

(51) Int. Cl.
| | |
|---|---|
| H04L 51/42 | (2022.01) |
| G06Q 10/10 | (2012.01) |
| H04M 1/72436 | (2021.01) |
| H04L 51/58 | (2022.01) |
| H04L 51/216 | (2022.01) |
| H04L 51/234 | (2022.01) |

(52) U.S. Cl.
CPC ........... *H04L 51/42* (2022.05); *G06Q 10/107* (2013.01); *H04L 51/216* (2022.05); *H04L 51/234* (2022.05); *H04L 51/58* (2022.05); *H04M 1/72436* (2021.01)

(58) Field of Classification Search
CPC ......... H04L 51/22; H04L 51/16; H04L 51/34; H04L 51/38; H04L 51/42; H04L 51/216; H04L 51/234; H04L 51/58; G06Q 10/107; H04M 1/72436; H04M 1/72412
See application file for complete search history.

(56) References Cited

U.S. PATENT DOCUMENTS

| | | | |
|---|---|---|---|
| 6,480,712 B1 * | 11/2002 | Vigil | H04W 4/14 370/467 |
| 6,484,196 B1 | 11/2002 | Maurille | |
| 7,110,510 B1 * | 9/2006 | Shaffer | H04M 3/533 379/88.25 |
| 7,164,928 B2 | 1/2007 | Ding et al. | |

(Continued)

FOREIGN PATENT DOCUMENTS

| | | |
|---|---|---|
| CN | 107251071 A | 10/2017 |
| EP | 1446781 B1 | 10/2006 |

(Continued)

*Primary Examiner* — Ariel Mercado
*Assistant Examiner* — Phoebe X Pan
(74) *Attorney, Agent, or Firm* — Perkins Coie LLP (57) ABSTRACT

The disclosed system and method enable multiple user devices to track the read/unread status of received messages, even though the user reads the message on only one device. A server of a telecommunication network can receive, from a user device associated with a sender, a message sent to a recipient. The user device does not communicate to the server that the received message has been read. Upon receiving the message, the server can determine that the message is in reply to a message thread and can update a status of a second message in the message thread to the read status. The second message is the most recent message in the message thread sent by the recipient to the sender. The server can provide the updated status of the second message in the message thread to the multiple user devices associated with the sender.

17 Claims, 5 Drawing Sheets

(56) References Cited

U.S. PATENT DOCUMENTS

| | | | |
|---|---|---|---|
| 7,305,069 B1 | 12/2007 | Day | |
| 7,620,407 B1* | 11/2009 | Donald | H04L 51/58 709/206 |
| 8,285,267 B2 | 10/2012 | Vendrow et al. | |
| 8,331,912 B1 | 12/2012 | Lundy et al. | |
| 8,391,447 B2 | 3/2013 | Othmer et al. | |
| 8,458,271 B2 | 6/2013 | Best et al. | |
| 8,560,615 B2 | 10/2013 | Singh et al. | |
| 8,576,994 B2 | 11/2013 | Othmer et al. | |
| 8,600,363 B2 | 12/2013 | Vendrow et al. | |
| 8,738,715 B2 | 5/2014 | Roy et al. | |
| 8,849,322 B2 | 9/2014 | Roka | |
| 8,978,039 B2* | 3/2015 | Sutedja | G06F 9/54 719/310 |
| 9,401,900 B2 | 7/2016 | Levasseur et al. | |
| 9,560,001 B1 | 1/2017 | Collins et al. | |
| 9,742,721 B2* | 8/2017 | Li | H04L 51/234 |
| 9,948,592 B1 | 4/2018 | Collins et al. | |
| 10,110,548 B2* | 10/2018 | Clarke | H04L 12/1859 |
| 10,127,544 B2 | 11/2018 | McElmurry et al. | |
| 10,270,728 B1* | 4/2019 | Collins | H04L 51/42 |
| 10,467,602 B2 | 11/2019 | Davis et al. | |
| 10,659,418 B1* | 5/2020 | Collins | H04L 51/52 |
| 10,999,229 B2* | 5/2021 | Langholz | G06F 3/04817 |
| 2003/0055902 A1 | 3/2003 | Amir et al. | |
| 2003/0114174 A1* | 6/2003 | Walsh | H04W 4/14 455/466 |
| 2004/0153483 A1* | 8/2004 | Cox | H04L 51/58 |
| 2006/0080161 A1* | 4/2006 | Arnett | G06Q 10/10 705/7.31 |
| 2007/0143417 A1* | 6/2007 | Daigle | G06Q 10/107 709/206 |
| 2007/0192418 A1 | 8/2007 | Adams et al. | |
| 2008/0025230 A1 | 1/2008 | Patel et al. | |
| 2008/0098071 A1 | 4/2008 | Jones et al. | |
| 2008/0098072 A1 | 4/2008 | Jones et al. | |
| 2009/0031245 A1* | 1/2009 | Brezina | H04L 51/42 707/999.1 |
| 2009/0063631 A1* | 3/2009 | Jung | H04L 67/34 709/204 |
| 2009/0177484 A1* | 7/2009 | Davis | G06Q 30/02 706/11 |
| 2010/0056187 A1 | 3/2010 | Abuelsaad et al. | |
| 2010/0250682 A1* | 9/2010 | Goldberg | H04L 51/234 709/206 |
| 2010/0304766 A1* | 12/2010 | Goyal | H04L 51/34 455/466 |
| 2011/0022662 A1* | 1/2011 | Barber-Mingo | G06Q 10/06 706/47 |
| 2011/0087972 A1 | 4/2011 | Swink et al. | |
| 2012/0021727 A1* | 1/2012 | Kelly | H04W 4/14 455/412.1 |
| 2012/0058786 A1 | 3/2012 | Schatzmayr | |
| 2012/0179767 A1* | 7/2012 | Clarke | H04L 51/234 709/206 |
| 2012/0191799 A1* | 7/2012 | Pattan | H04L 51/234 709/206 |
| 2012/0231770 A1* | 9/2012 | Clarke | H04M 1/7243 455/414.1 |
| 2013/0305164 A1* | 11/2013 | Karunamuni | H04M 1/7243 715/752 |
| 2013/0339436 A1* | 12/2013 | Gray | H04L 51/24 709/204 |
| 2014/0222933 A1 | 8/2014 | Stovicek et al. | |
| 2014/0289644 A1* | 9/2014 | Clarke | H04L 51/234 715/752 |
| 2014/0297727 A1* | 10/2014 | Li | H04L 51/34 709/203 |
| 2014/0310365 A1* | 10/2014 | Sample | G06Q 10/107 709/206 |
| 2014/0344369 A1* | 11/2014 | Goldberg | H04L 51/234 709/206 |
| 2015/0134756 A1* | 5/2015 | Willis | H04L 51/216 709/206 |
| 2017/0171325 A1* | 6/2017 | Perez | H04L 51/22 |
| 2018/0032222 A1* | 2/2018 | Wang | G06F 16/00 |
| 2018/0359353 A1* | 12/2018 | Vlandis | H04L 51/04 |
| 2019/0087811 A1 | 3/2019 | McElmurry et al. | |
| 2019/0121907 A1* | 4/2019 | Brunn | G06F 16/353 |
| 2019/0306101 A1 | 10/2019 | Synal et al. | |
| 2019/0342247 A1 | 11/2019 | Langholz | |
| 2020/0329004 A1* | 10/2020 | Carbune | G06Q 10/00 |
| 2021/0126886 A1* | 4/2021 | Robinson | H04L 51/42 |

FOREIGN PATENT DOCUMENTS

| | | |
|---|---|---|
| EP | 1819112 B1 | 12/2008 |
| EP | 2475139 A1 | 7/2012 |
| EP | 3035264 A1 | 6/2016 |
| JP | 6596503 B2 | 10/2019 |
| WO | 9948011 A1 | 9/1999 |
| WO | 2012092679 A1 | 7/2012 |
| WO | 2013136354 A1 | 9/2013 |
| WO | 2016099493 A1 | 6/2016 |

* cited by examiner

SYNCHRONIZING MESSAGE STATUS ACROSS MULTIPLE USER DEVICES

BACKGROUND

In today's technologically connected world, a single user can have multiple devices, such as a smart watch, a cell phone, a tablet, and a laptop, all of which receive messages directed to the user, such as text messages or emails. The user can read one message on the cell phone, and another message on the laptop. Once the user reads the message, the device on which the message was viewed marks the message as read. However, the device does not propagate the read status to the rest of the devices. This can cause the other devices to present the same messages to the user to read, even though the user has already read those messages. Repeated requests to view and read the same message from multiple devices can be cumbersome.

DETAILED DESCRIPTION

Certain devices supporting legacy messages such as short message service (SMS) and multimedia messaging service (MMS) messages do not notify a server of a cellular network when the message has been read. The server stores copies of the messages and the message statuses, such as read or unread, and can synchronize the message statuses among multiple user devices. For example, if the user reads a received message on his cell phone and the cell phone does not notify the server that the message has been read, the same message will be marked as unread on the user's PC and/or the user's tablet. The disclosed system enables the server to mark messages as read, without receiving a notification from the user device whether the message was read.

For example, if a server receives from a sender, a message responding to the last message in a message thread, the server can mark all the messages in the message thread as read, or the server can mark only the most recent message as read. A conversation containing the message can be split up into single or multiple folders. Even if the conversation containing the message is split up into multiple folders, all the messages in multiple folders can be marked as read. The server can then propagate the updated message status to other user devices.

Figure 1:
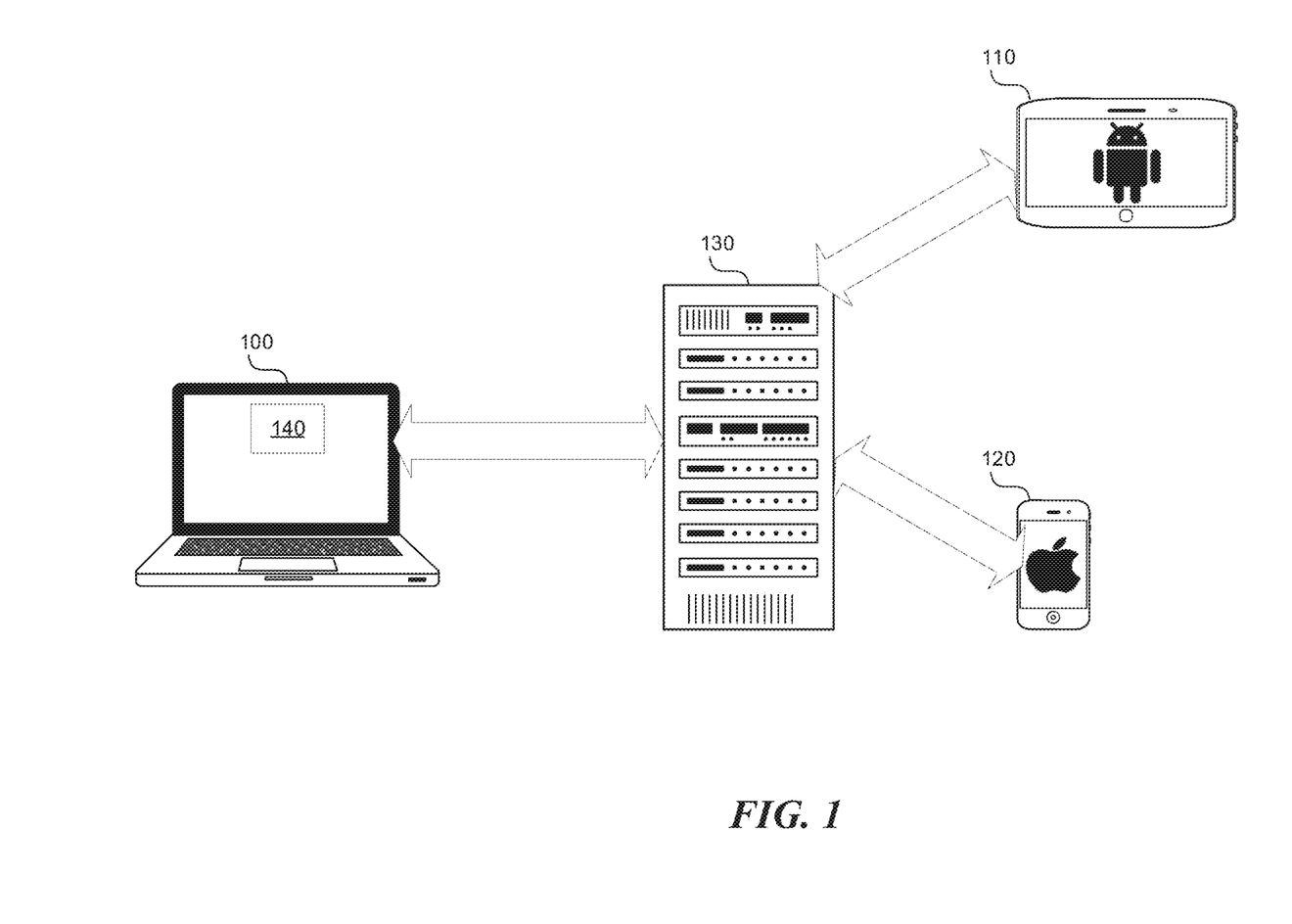
FIG. 1 shows multiple user devices in communication with the server.

FIG. 1 shows multiple user devices in communication with the server. Multiple user devices 100, 110, 120 such as laptops, tablets, mobile phones, smart watches, etc. can be in communication with the server 130 using wireless or wired communication networks, such as local area network (LAN), cellular network, data network, the Internet, etc. Multiple user devices 100, 110, 120 can belong to the same user and can receive the same messages for the user, such as SMS or MMS message, email messages, etc.

The user can receive many messages and can read each message on a different device 100, 110, 120. When a user reads a message 140 on the device 100, the device 100 marks the message as read; however, devices 110, 120 do not know that the message has been read and can present the message 140 to the user to read it again. Receiving a notification to read the same message repeatedly is cumbersome to the user.

Consequently, the server 130 can send updates between the devices 100, 110, 120 when a message 140 has been read on at least one of the devices 100, 110, 120. The message 140 can be a response to a long thread of messages between two or more users. Each device 100, 110, 120 can store a copy of the whole thread. The server 130 can store one copy of the whole thread for each participant in the message. For example, if the message thread has a sender and 10 participants, the server can store 11 copies of the message thread, representing the read/unread status for each of the 11 participants.

In one embodiment, the device 100, on which the message was read, can send an update to the server 130 to inform the server that the message has been read. Upon receiving the update, the server 130 can mark the message 140 as read and can communicate to the devices 110, 120 that the message 140 has been read. In another embodiment, the device 100 does not send an update to the server 130 that the message has been read. Instead, when the server 130 receives a reply to the message 140, sent by the user of the device 100, the server 130 can mark the message 140 as read, and it can send a notification to the devices 110, 120 that the message 140 has been read. Each message in the message thread can have a unique ID so that the server 130 and the devices 100, 110, 120 can uniquely identify the message that has been marked as read.

To send a notification to the devices 100, 110, 120, the server 130 can send a push notification via a RESTful API with or without an existing subscribe/publish call flow to the devices 100, 110, 120. To minimize the number of operations that the server 130 has to perform, and to increase the responsiveness of the server 130, the server can reduce the communication with the devices 100, 110, 120. Instead of sending updates whenever the server 130 changes the status of a message, the server can wait to change the statuses of multiple messages and then communicate the statuses of the multiple messages with the devices 100, 110, 120 through a single bulk notification. For example, if the server 130 marks more than one message read, as described in this application, the server 130 can send a bulk read notification for all message IDs that were marked as read. The server 130 can also send a bulk read notification to trigger the devices 100, 110, 120 to synchronize message statuses with the server 130.

The server 130 and the devices 100, 110, 120 can communicate with each other using a push notification with a list of all message IDs that are marked as read, or a RESTful API message synchronization. The RESTful API message can be triggered by a push notification or by bringing the mobile application/web client handling the message 140 to the foreground on the display of the device 100, 110, 120.

Figure 2:
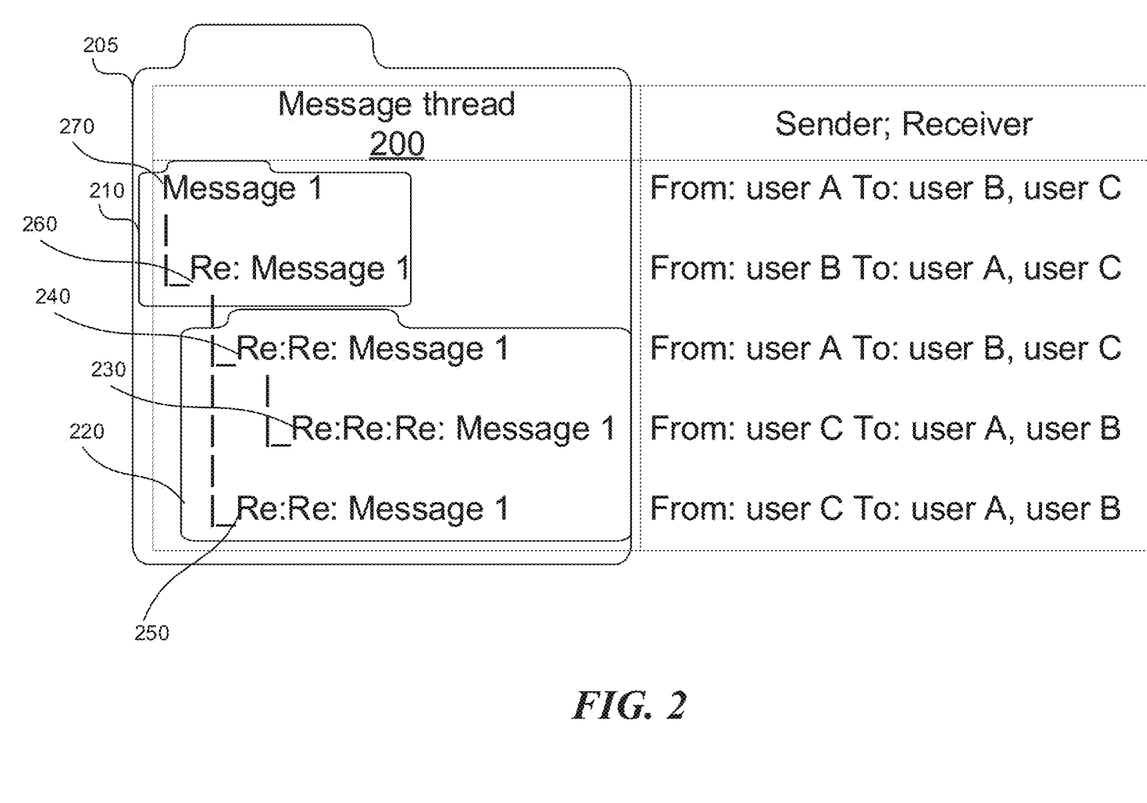
FIG. 2 shows the read/unread status of messages stored on the server.

FIG. 2 shows the read/unread status of messages stored on the server. The server 130 in FIG. 1 can store a copy of a message thread 200. The message thread 200 can include messages that use SMS, MMS, page-mode, large mode, or session-mode messages.

SMS is a text messaging service component of most telephone, Internet, and mobile device systems. SMS uses standardized communication protocols to enable mobile devices to exchange short text messages. An intermediary service can facilitate a text-to-voice conversion to be sent to landlines.

MMS is a standard way to send messages that include multimedia content to and from a mobile phone over a cellular network. Users and providers can refer to such a message as a PXT, a picture message, or a multimedia message. The MMS standard extends the core SMS capability, allowing the exchange of text messages greater than 160 characters in length. Unlike text-only SMS, MMS can deliver a variety of media, including up to forty seconds of video, one image, a slideshow of multiple images, or audio.

A page-mode message is a message sent between two endpoints without establishing the signaling session. A large mode message is sent when a SIP session is established between two endpoints, where the SIP session is only used to transmit exactly one large message after which the SIP session is torn down. Session-mode is an instant message passed between two endpoints having an established signaling session.

The message thread 200 can be between one sender and one receiver, or can be between one sender and many receivers. The server 130 can store up to three copies of the message thread 200, one copy for each of the participants in the message thread, namely user A, B and C. Message thread 200 can represent user C's copy. The message thread 200 can be split up into one or more conversations, each stored in a unique folder 210, 220. Each conversation can have a unique conversation identification (ID). In one embodiment, the message thread 200 has a single conversation ID when the participants in the message thread 200 are the same.

In another embodiment, even though the message thread 200 has the same participants, the message thread 200 can be split into multiple conversation folders 210, 220, having different conversation IDs. The message thread 200 can be split into multiple conversations folders 210, 220 based on time elapsed between subsequent responses. For example, even if the participants are the same, after a 3-minute delay between subsequent messages in a message thread 200, the message thread 200 is split into a new conversation folder 210 having a new conversation ID. After another 3 minutes, the message thread 200 is split into another conversation folder 220 having a new conversation ID.

The steps of marking messages as "read" depend upon how the message thread 200 is stored on the server 130. When the server 130 receives a message sent by a user, the server 130 can perform various operations.

In one embodiment, the server 130 can be configured to keep the message thread 200 in a single message folder 205 for messages having the same recipients. Once the server 130 receives a message 230, the server 130 can determine a unique participant ID of the sender and can determine a unique participant ID of the one or more receivers. The unique participant ID can be a mobile number, an E.164 address, or a login name associated with the participant.

In one example of the above embodiment, upon determining the sender and receiver(s) of the message 230, the server 130 can mark as read the last message received by the sender of the message 230 from the receiver(s) of the message 230. In FIG. 2, the last message received by the sender, namely user C, from the receiver, namely either user A or user B, is message 240 because the message 240 was received by user C, from user A, one of the receivers of message 230. Thus, the sender, in this case user C, sees only the prior message sent from the receiver to the sender as read, on all of the sender's devices.

In another example of the above embodiment, the server 130, upon receiving the message 230 and determining the unique participant IDs, can mark as read all of the sender's prior messages received from the receiver. In FIG. 2, all the messages 230, 240, 250, 260, 270 are marked as read. Thus, the sender sees all the prior messages sent from the receiver to the sender as read, on all of the sender's devices.

In another embodiment, the server 130 can be configured to keep the message thread 200 in multiple message folders 210, 220 for messages having the same recipients. The server 130 can determine the unique participant ID of the sender and the receiver(s) of the message 230, as described above. The server can determine the folder 220, in which the message 230 is received. In one example, the server 130 can mark as read the last message 240 received by the sender of the message 230 from the receiver(s) of the message 230, when the message 240 is in the same folder as the message 230. Thus, the sender sees only the prior message sent from the receiver to the sender as read, on all of the sender's devices.

In another example of the above embodiment, the server 130, upon receiving the message 230 and determining the unique participant IDs, can mark as read all of sender's prior messages received from the receiver. In a more specific example, the marked messages can be all the messages stored in the folder 220, for example, 230, 240, 250, but not in folder 210. Alternatively, the marked messages can be all the messages stored in all of the folders 210, 220, for example, the messages 230, 240, 250, 260, 270. Thus, the sender sees all the prior messages sent from the receiver to the sender as read, on all of the sender's devices.

To reduce the number of operations that the server 130 has to perform, and to increase the responsiveness of the server, the server can be configured by default to mark only the previous message as read, as opposed to marking all of the previous messages as read.

Figure 3:
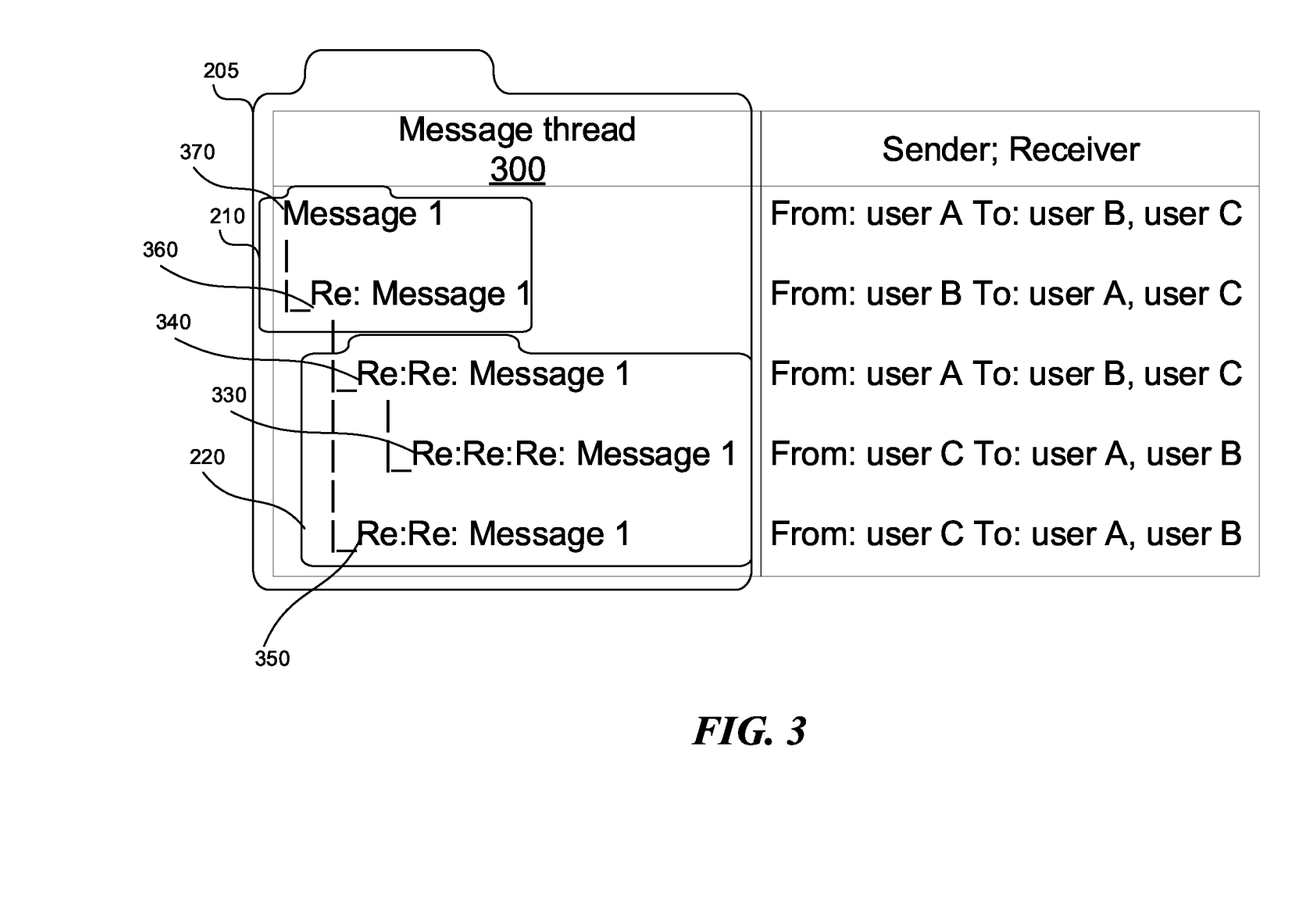
FIG. 3 shows the read/unread status of messages stored on a user device.

FIG. 3 shows the read/unread status of messages stored on a user device. The user device 100, 110, 120 in FIG. 1 can have a local configuration file specifying which messages to mark as read upon receiving a notification from the server 130 in FIG. 1 that a message 330 has been marked as read. The configuration file of the user device 100, 110, 120 can be different from the configuration of the server 130. For example, the server 130 can mark only the last message as read, while the user device 100, 110, 120 can mark all the messages in the message thread as read. The configuration file can be embedded directly in code stored on the user device 100, 110, 120. The configuration file can be JSON/XML-based.

For example, the user device 100, 110, 120 can store a message thread 300, in which all the messages 330, 340, 350, 360, 370 include the same participants, namely user A, user B, and user C. The message thread 300 corresponds to the message thread 200 in FIG. 2 stored on the server 130.

In one example, the server 130 can mark the second message 330, received by users A and B and sent by user C, as read, regardless of how many folders the message thread 200 is divided into on the server 130. The server 130 can send a notification to the user device 100, 110, 120 that message 230 corresponding to the message 330 has been marked read on the server. In response, the user device 100, 110, 120 can mark all prior messages from user C, namely message 350, as read, even though the corresponding message 250 stored on the server 130 is not marked as read.

In another example, the server 130 can mark the second message 330, received by users A and B and sent by user C, as read, but only in the folder to which the corresponding message 230 belongs, namely folder 220. The server 130 can send a notification to the user device 100, 110, 120 that message 230 corresponding to the message 330 has been marked read on the server. The user device 100, 110, 120, can mark all prior messages from user C, namely message 350, as read even though the corresponding message 250 stored on the server 130 is not marked as read.

In the third example, the user device 100, 110, 120, upon receiving a notification from the server 130 that that message 230 corresponding to the message 330 has been marked read on the server, can only mark the message 330 as read, without marking the rest of the messages 340, 350, 360, 370 as read.

The default policy for the user device 100, 110, 120, in contrast to the default policy for the server 130, can be to mark as read all of the prior messages 340, 350, 360, 370. As a result, the server can send a short message to the client, indicating which messages to mark as read, and the client can mark multiple messages as read in response. This type of compact communication preserves network bandwidth, and decreases the amount of operations that the server 130 needs to perform.

Figure 4:
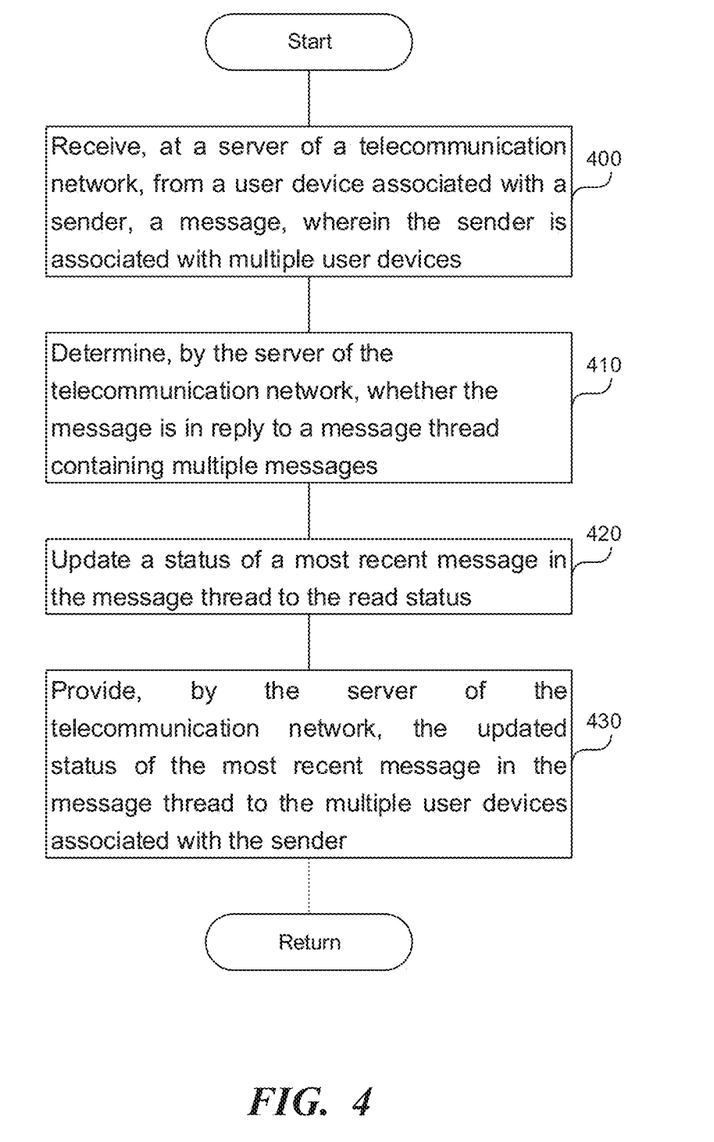
FIG. 4 is a flowchart of a method to synchronize read or unread statuses of text messages across multiple user devices.

FIG. 4 is a flowchart of a method to synchronize read or unread statuses of text messages across multiple user devices. In step 400, a hardware or a software processor executing instructions can receive, at a server of a telecommunication network, from a user device associated with a sender, a message including an SMS or MMS message. The sender can be associated with multiple user devices. Each of the user devices can store the message, and a whole thread of messages. The user can read a message on any of the user devices, and the user device on which the message is read can update the status of the message thread. However, the user device on which the message is read, upon updating the status of a received message to a read status, does not communicate to the server of a telecommunication network that the received message has been read.

In step 410, the server can determine whether the message is in reply to a message thread containing multiple messages. To make the determination, the server can obtain message participant identifications (IDs) including a unique identification associated with the sender and a unique ID of a recipient. Upon finding a message thread having the same participant IDs as the message, the server can determine that the message is in reply to the message thread.

The unique participant ID can include a mobile number or an E.164 address. E.164 is an international standard that defines a numbering plan for the worldwide public switched telephone network and some other data networks.

In step 420, the server, upon determining that the message is in reply to the message thread, can update a status of a second message in the message thread to the read status. The second message is the most recent message in the message thread sent by the recipient to the sender. The server can also update statuses of all messages in the message thread to the read status. In addition, the server can add the message to the message thread.

In step 430, the server can provide the updated status of the second message in the message thread to the multiple user devices associated with the sender.

The server can maintain a copy of the message thread for each participant in the message thread, including the sender and the one or more recipients. The statuses of messages contained in the various copies can be independent of each other. For example, the server can determine that the recipient is a user of the telecommunication network. The server can maintain a copy of the message thread associated with the recipient and can update a status of a message in the copy of the message thread associated with the recipient independently of updating the read or unread status of the second message in the message thread associated with the sender.

In one embodiment, once the server determines that a message status needs to be updated, the server can send to a second user device of the sender an instruction to mark all SMS or MMS messages in the message thread as read, regardless of whether the server marked only one, or all, of the messages as read. Upon receiving the instruction, the second user device can mark all messages in the message thread with the read status.

In another embodiment, once the server determines that a message status needs to be updated, the server can send to a second user device of the sender an instruction to mark the second message in the message thread as read, regardless of whether the server marked only one, or all, of the messages as read. Upon receiving the instruction, the second user device can mark the second message, or all messages, in the message thread with the read status.

The server can organize the message thread into one or more folders based on time lapsed between consecutive messages in the message thread. In one embodiment, the server can update message status only if the newly received message is in the same folder as the most recent stored message. In another embodiment, the server can determine that the most recent stored message is in a different folder than the newly received message, and, even though the newly received message and the most recently stored messages are in different folders, the server can update the status of the second message to the read status.

Computer

Figure 5:
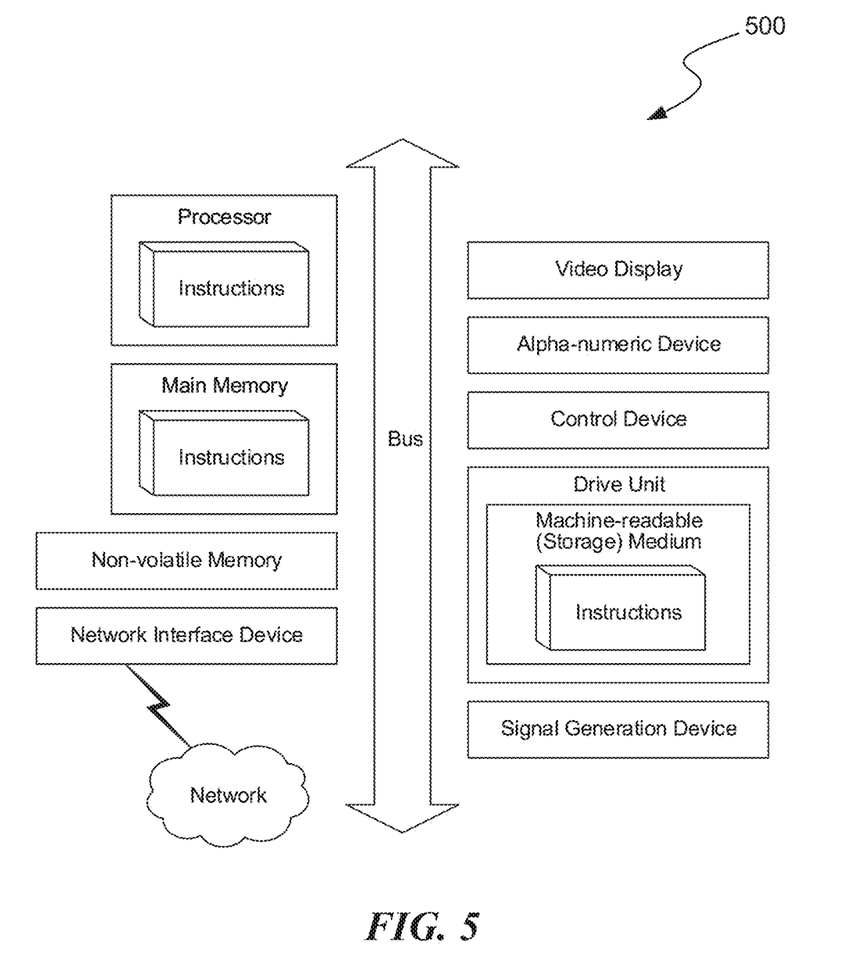
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can be associated with the server 130 in FIG. 1 and/or the user devices 100, 110, 120 in FIG. 1. The processor of the computer system 500 can execute the various instructions described in this application, for example, instructions described in FIG. 4. The main memory, the nonvolatile memory and/or the drive unit of the computer system 500 can store the instructions executed by the processor. The network of the computer system 500 can be used to communicate between the server 130 and the user devices 100, 110, 120.

This disclosure contemplates the computer system 500 taking any suitable physical form. As example and not by way of limitation, computer system 500 can be an embedded computer system, a system-on-chip (SOC), a single-board computer system (SBC) (such as, for example, a computeron-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory can not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method to synchronize a read or unread status of text messages across multiple user devices comprising:
   receiving, at a server of a wireless telecommunication network, from a wireless user device associated with a sender, a message including a short message service (SMS) message or a multimedia messaging service (MMS) message,
      wherein the sender is associated with the multiple user devices, and
      wherein the user device, upon updating a status of a received message to a read status, does not communicate to the server of the wireless telecommunication network that the received message has been read;
   determining, by the server of the wireless telecommunication network, whether the message is in reply to a message thread containing multiple messages, wherein the determining includes:
      obtaining message participant identifications (IDs) including a unique identification associated with the sender and a unique ID of a recipient, and
      upon finding the message thread having the message participant IDs, determining that the message is in reply to the message thread;
   determining that the recipient is a user of the wireless telecommunication network;
   maintaining, by the server of the wireless telecommunication network, a copy of the message thread associated with the recipient;
   upon determining, by the server of the wireless telecommunication network, that the message is in reply to the message thread, updating a status of a second message in the message thread to the read status, wherein the second message is a most recent message in the message thread sent by the recipient to the sender;
   updating, at the server of the wireless telecommunication network, a status of a message in the copy of the message thread associated with the recipient independently of updating the read or unread status of the second message in the message thread; and
   providing, by the server of the wireless telecommunication network, the updated status of the second message in the message thread to the multiple user devices associated with the sender.

2. The method of claim 1, further comprising adding the message to the message thread.

3. The method of claim 1, further comprising:
   upon determining that the message is in reply to the message thread, updating statuses of all messages in the message thread to the read status.

4. The method of claim 1, further comprising:
   obtaining at a second user device of the sender an instruction to mark all messages in the message thread as read; and
   upon receiving the updated status of the second message in the message thread from the server of the wireless telecommunication network, marking all messages in the message thread with the read status.

5. The method of claim 1, further comprising:
   obtaining at a second user device of the sender an instruction to mark the second message in the message thread with the read status; and
   upon receiving the updated status of the second message in the message thread, from the server of the wireless telecommunication network, marking the second message in the message thread with the read status.

6. The method of claim 1, further comprising:
   organizing the message thread into one or more folders based on time lapsed between consecutive messages in the message thread.

7. The method of claim 1, further comprising:
   organizing the message thread into multiple folders based on time lapsed between consecutive messages in the message thread;
   determining that the second message is in a different folder than the message; and
   updating the status of the second message to the read status.

8. The method of claim 1, wherein the unique ID comprises a mobile number or an E.164 address.

9. A system comprising:
   one or more processors;
   memory coupled to the one or more processors, wherein the memory includes instructions executable by the one or more processors to:

receive a message, at a server of a telecommunication network, from a user device associated with a sender, a message including a short message service (SMS) message or a multimedia messaging service (MMS) message, wherein the sender is associated with multiple user devices, and wherein the user device upon, updating a status of a received message to a read status, does not communicate to the server of the telecommunication network that the received message has been read;

determine, by the server of the telecommunication network, whether the message is in reply to a message thread containing multiple messages, wherein to determine includes to:

obtain message participant identifications (IDs) including a unique identification associated with the sender and a unique ID of a recipient, and upon finding the message thread having the message participant IDs, determine that the message is in reply to the message thread;

determine that the recipient is a user of the telecommunication network;

maintain, by the server of the telecommunication network, a copy of the message thread associated with the recipient;

upon determining, by the server of the telecommunication network, that the message is in reply to the message thread, update a status of a second message in the message thread to the read status;

update, at the server of the wireless telecommunication network, a status of a message in the copy of the message thread associated with the recipient independently of updating the read or unread status of the second message in the message thread; and, provide, by the server of the telecommunication network, the updated status of the second message in the message thread to the multiple user devices associated with the sender.

10. The system of claim 9, further comprising the instructions to:

upon determining that the message is in reply to the message thread, update statuses of all messages in the message thread to the read status.

11. The system of claim 9, further comprising the instructions to:

obtain at a second user device of the sender an instruction to mark all messages in the message thread as read; and upon receiving the updated status of the second message in the message thread from the server of the telecommunication network, mark all messages in the message thread with the read status.

12. The system of claim 9, further comprising the instructions to:

obtain at a second user device of the sender an instruction to mark the second message in the message thread with the read status; and upon receiving the updated status of the second message in the message thread, from the server of the telecommunication network, mark the second message in the message thread with the read status.

13. The system of claim 9, further comprising the instructions to:

organize the message thread into one or more folders based on time lapsed between consecutive messages in the message thread.

14. The system of claim 9, further comprising the instructions to:

organize the message thread into multiple folders based on time lapsed between consecutive messages in the message thread;

determine that the second message is in a different folder than the message; and update the status of the second message to the read status.

15. At least one non-transitory, computer-readable medium, carrying instructions that, when executed by at least one data processor, performs a method comprising:

receiving a message, at a server of a wireless telecommunication network and from a wireless user device associated with a sender, a message including a short message service (SMS) message or a multimedia messaging service (MMS) message, wherein the sender is associated with multiple user devices, and wherein the user device, upon updating a status of a received message to a read status, does not communicate to the server of the wireless telecommunication network that the received message has been read;

determining, by the server of the wireless telecommunication network, whether the message is in reply to a message thread containing multiple messages, wherein the determining includes:

obtaining message participant identifications (IDs) including a unique identification associated with the sender and a unique ID of a recipient, and upon finding the message thread having the message participant IDs, determining that the message is in reply to the message thread;

determining that the recipient is a user of the wireless telecommunication network;

maintaining, by the server of the wireless telecommunication network, a copy of the message thread associated with the recipient; and upon determining, by the server of the wireless telecommunication network, that the message is in reply to the message thread, updating a status of a second message in the message thread to the read status;

updating, at the server of the wireless telecommunication network, a status of a message in the copy of the message thread associated with the recipient independently of updating the read or unread status of the second message in the message thread; and, providing, by the server of the wireless telecommunication network, the updated status of the second message in the message thread to the multiple user devices associated with the sender.

16. The computer-readable medium of claim 15, further comprising:

upon determining that the message is in reply to the message thread, updating statuses of all messages in the message thread to the read status.

17. The computer-readable medium of claim 15, further comprising:

organizing the message thread into multiple folders based on time lapsed between consecutive messages in the message thread;

determining that the second message is in a different folder than the message; and updating the status of the second message to the read status.

* * * * *